United States Patent
Robinson (10) Patent No.: US 10,538,883 B2
(45) Date of Patent: *Jan. 21, 2020

(54) HELICALLY-PACKAGED EXPANSION JOINT SEAL SYSTEM PREPARED FOR CHANGE IN DIRECTION

(71) Applicant: Schul International Co., LLC, Pelham, NH (US)

(72) Inventor: Steven R. Robinson, Windham, NH (US)

(73) Assignee: Schul International Co., LLC, Hudson, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,080

(22) Filed: May 14, 2019

(65) Prior Publication Data

US 2019/0264397 A1   Aug. 29, 2019

Related U.S. Application Data

(63) Continuation of application No. 16/173,823, filed on Oct. 29, 2018, now Pat. No. 10,385,518, which is a continuation of application No. 15/854,152, filed on Dec. 26, 2017, now Pat. No. 10,227,734.

(51) Int. Cl.
| | |
|---|---|
| *E01C 11/10* | (2006.01) |
| *E04B 1/68* | (2006.01) |
| *B32B 5/18* | (2006.01) |
| *B32B 5/32* | (2006.01) |
| *B29D 99/00* | (2010.01) |
| *E04B 1/94* | (2006.01) |
| *B32B 7/12* | (2006.01) |
| *E04C 2/284* | (2006.01) |

(52) U.S. Cl.
CPC ............ *E01C 11/10* (2013.01); *B29D 99/001* (2013.01); *B32B 5/18* (2013.01); *B32B 5/32* (2013.01); *E04B 1/6801* (2013.01); *E04B 1/6812* (2013.01); *B32B 7/12* (2013.01); *E04B 1/948* (2013.01); *E04C 2/284* (2013.01)

(58) Field of Classification Search
CPC ........ E01C 11/10; E04B 1/6812; E04C 2/284; E04C 11/106
See application file for complete search history.

(56) References Cited

U.S. PATENT DOCUMENTS

| | | | |
|---|---|---|---|
| 3,507,735 | A | 4/1970 | Chisholm |
| 4,767,655 | A | 8/1988 | Tschudin-Mahrer |
| 4,887,368 | A | 12/1989 | Latzke |
| 6,685,196 | B1 | 2/2004 | Baerveldt |
| 8,317,444 | B1 | 11/2012 | Hensley |
| 8,341,908 | B1 | 1/2013 | Hensley et al. |
| 8,365,495 | B1 | 2/2013 | Witherspoon |
| 8,739,495 | B1 | 6/2014 | Witherspoon |
| 8,813,449 | B1 | 8/2014 | Hensley et al. |

(Continued)

FOREIGN PATENT DOCUMENTS

JP   2002061794 A   2/2002

OTHER PUBLICATIONS

European Search Report for EP18211160.9, dated May 21, 2019, 6pgs.

*Primary Examiner* — Patrick J Maestri
(74) *Attorney, Agent, or Firm* — Crain, Caton & James, P.C.; James E. Hudson, III (57) ABSTRACT

A foam-based expansion joint seal system packaging which facilitates transport and reduces the need for internal splices.

18 Claims, 3 Drawing Sheets

(56) References Cited

U.S. PATENT DOCUMENTS

| | | |
|---|---|---|
| 8,813,450 B1 | 8/2014 | Hensley et al. |
| 8,870,506 B2 | 10/2014 | Hensley et al. |
| 9,068,297 B2 | 6/2015 | Hensley et al. |
| 9,200,437 B1 | 12/2015 | Hensley et al. |
| 9,206,596 B1 | 12/2015 | Robinson |
| 9,322,163 B1 | 4/2016 | Hensley |
| 9,404,581 B1 | 8/2016 | Robinson |
| 9,528,262 B2 | 12/2016 | Witherspoon |
| 9,631,362 B2 | 4/2017 | Hensley et al. |
| 9,637,915 B1 | 5/2017 | Hensley et al. |
| 9,644,368 B1 | 5/2017 | Witherspoon |
| 9,670,666 B1 | 6/2017 | Witherspoon et al. |
| 9,689,157 B1 | 6/2017 | Hensley et al. |
| 9,689,158 B1 | 6/2017 | Hensley et al. |
| 9,732,853 B2 | 8/2017 | Kethorn et al. |
| 9,739,049 B1 | 8/2017 | Robinson |
| 9,739,050 B1 | 8/2017 | Hensley et al. |
| 9,745,738 B2 | 8/2017 | Robinson |
| 9,765,486 B1 | 9/2017 | Robinson |
| 9,803,357 B1 | 10/2017 | Robinson |
| 9,840,814 B2 | 12/2017 | Robinson |
| 9,850,662 B2 | 12/2017 | Hensley |
| 9,856,641 B2 | 1/2018 | Robinson |
| 9,951,515 B2 | 4/2018 | Robinson |
| 9,963,872 B2 | 5/2018 | Hensley et al. |
| 9,982,428 B2 | 5/2018 | Robinson |
| 9,982,429 B2 | 5/2018 | Robinson |
| 9,995,036 B1 | 6/2018 | Robinson |
| 10,000,921 B1 | 6/2018 | Robinson |
| 10,060,122 B2 | 8/2018 | Robinson |
| 10,066,386 B2 | 9/2018 | Robinson |
| 10,066,387 B2 | 9/2018 | Hensley et al. |
| 2008/0172967 A1 | 7/2008 | Hilburn |
| 2010/0304078 A1 | 12/2010 | Stol et al. |
| 2011/0266050 A1 | 11/2011 | Su et al. |
| 2014/0219719 A1 | 8/2014 | Hensley et al. |
| 2014/0360118 A1 | 12/2014 | Hensley et al. |
| 2015/0068139 A1 | 3/2015 | Witherspoon |
| 2017/0130450 A1 | 5/2017 | Witherspoon |
| 2017/0159817 A1 | 6/2017 | Robinson |
| 2017/0191256 A1 | 7/2017 | Robinson |
| 2017/0226733 A1 | 8/2017 | Hensley et al. |
| 2017/0241132 A1 | 8/2017 | Witherspoon |
| 2017/0254027 A1 | 9/2017 | Robinson |
| 2017/0268222 A1 | 9/2017 | Witherspoon et al. |
| 2017/0292262 A1 | 10/2017 | Hensley et al. |
| 2017/0298618 A1 | 10/2017 | Hensley et al. |
| 2017/0314213 A1 | 11/2017 | Robinson |
| 2017/0314258 A1 | 11/2017 | Robinson |
| 2017/0342665 A1 | 11/2017 | Robinson |
| 2017/0342708 A1 | 11/2017 | Hensley et al. |
| 2017/0370094 A1 | 12/2017 | Robinson |
| 2018/0002868 A1 | 1/2018 | Robinson |
| 2018/0016784 A1 | 1/2018 | Hensley et al. |
| 2018/0038095 A1 | 2/2018 | Robinson |
| 2018/0106001 A1 | 4/2018 | Robinison |
| 2018/0106032 A1 | 4/2018 | Robinison |
| 2018/0119366 A1 | 5/2018 | Robinison |
| 2018/0142465 A1 | 5/2018 | Robinison |
| 2018/0148922 A1 | 5/2018 | Robinison |
| 2018/0163394 A1 | 6/2018 | Robinison |
| 2018/0171564 A1 | 6/2018 | Robinison |
| 2018/0171625 A1 | 6/2018 | Robinison |
| 2018/0202148 A1 | 7/2018 | Hensley et al. |
| 2018/0238048 A1 | 8/2018 | Robinison |

HELICALLY-PACKAGED EXPANSION JOINT SEAL SYSTEM PREPARED FOR CHANGE IN DIRECTION

CROSS-REFERENCE TO RELATED APPLICATIONS

This application is a continuation of U.S. patent application Ser. No. 16/173,823 for Helically-packaged expansion joint seal system with coiling, tear strips or secondary packaging, filed Oct. 29, 2018, which is incorporated herein by reference and the benefit of and priority to are hereby claimed, which is a continuation of U.S. patent application Ser. No. 15/854,152 for Helically-packaged expansion joint seal system, filed Dec. 26, 2017 and issued Mar. 12, 2019 as U.S. Pat. No. 10,227,734, which is incorporated herein by reference and the benefit of and priority to are hereby claimed.

STATEMENT REGARDING FEDERALLY SPONSORED RESEARCH OR DEVELOPMENT

Not Applicable.

BACKGROUND

Field

The present disclosure relates generally to packaging of systems for creating a durable seal between adjacent panels, including those which may be subject to seismic or temperature expansion and contraction and/or mechanical shear. More particularly, the present disclosure is directed to a design for packaging and shaping/forming such expansion joint seal systems which facilitates transport, reduces material damage, the need for internal splices and waste.

Description of the Related Art

Construction panels come in many different sizes and shapes and may be used for various purposes, including roadways, sideways, and pre-cast structures, particularly buildings. Use of precast concrete panels for interior and exterior walls, ceilings and floors, for example, has become more prevalent. As precast panels are often aligned in generally abutting relationship, forming a lateral gap or joint between adjacent panels to allow for independent movement, such in response to ambient temperature variations within standard operating ranges, building settling or shrinkage and seismic activity. Moreover, these joints are subject to damage over time. Most damage is from vandalism, wear, environmental factors and when the joint movement is greater, the seal may become inflexible, fragile or experience adhesive or cohesive failure. As a result, "long lasting" in the industry refers to a joint likely to be usable for a period greater than the typical lifespan of five (5) years. Various seals have been created in the field.

Various seal systems and configurations have been developed for imposition between these panels to provide seals which provide one or more of fire protection, waterproofing, sound and air insulation. This typically is accomplished with a seal created by imposition of multiple constituents in the joint, such as silicone application, backer bars, and compressible foams.

Foam-based expansion joint seal systems are typically shipped in sticks, which often is a six-to-ten foot straight segment, or in rolls wherein the external layer is adhered to a release tape to permit the wrapping around a reel. Providing the joint seal system in a stick permits the product, in particular joint seals having a final width greater than one inch, to be compressed at the factory, i.e. pre-compressed, laterally, so the installer on site may remove the packaging and install the expansion joint seal system before it expands beyond the gap of the expansion joint. Higher compression ratios, coupled with slower release time, facilitate the installation and function of such precompressed, stick-based expansion joint seal systems. Alternatively, the expansion joint seal may be provided on a roll, where successive layers are wrapped around a center, permitting immediate compression during wrapping.

Each shipping system has shortcomings. With the stick, the compressed product is typically encased in a shrink wrap sleeve, which shrinks when heated. Unfortunately, this is applied to each stick, which is limited in length due to shipping sizes, typically to six to ten foot sections. As a result, during shipping, the stick may be subjected to bending forces, such as when loaded on a truck over other materials, which causes the shrink wrap to crack or fail along a seal, permitting the compressed product to expand through the resultant opening and rendering the product unusable. Because the packaging is sized for conventional shipment, the sticks are typically limited to not more than ten (10) feet. Even with the size limitation the sticks are too long for easy handling which can result in damage in transit or added delivery fees. As a result, the resulting sections must be joined with a splice to fit within the actual expansion joint. Moreover, because each stick is individually packaged, when the packaging is opened, the entire stick begins to expand. That portion which exceeds the required length is often lost as it is cut off because it expands to size greater than the intended gap, therefore is discarded. With the roll, because any compression is generally radially as each successive layer is deposited, compression is possible in only one direction, but difficult to control over time due to the varying radius of the material and the potential for localized areas of higher or lower compression.

SUMMARY

The present disclosure therefore meets the above needs and overcomes one or more deficiencies in the prior art by providing a packaging of systems for creating a durable seal between adjacent panels. In particular, the present disclosure provides a foam-based expansion joint seal system which can be of longer length, shipped conventionally, facilitates constant and equal compression throughout the system, and precludes loss of large segments of material.

The disclosure provides an expansion joint seal system which includes a longitudinal body of foam in compression; a water-resistant constituent, the water-resistant constituent adhered to the longitudinal body of foam on a first surface or contained within the longitudinal body of foam in compression; and a casing helically encircling the longitudinal body of foam in compression and the water-resistant constituent.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DETAILED DESCRIPTION

Figure 1:
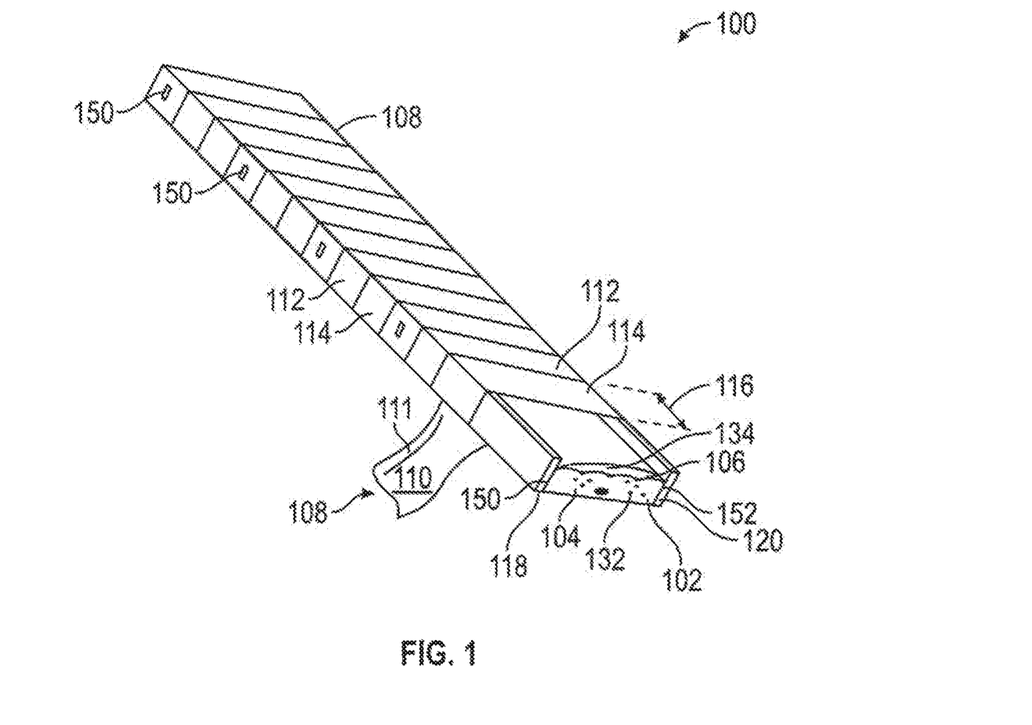
FIG. 1 provides an end view of one embodiment of the present disclosure.

Referring to FIG. 1, the packaging 100 of the present invention is illustrated. An expansion joint seal system 102, composed of a longitudinal body of foam 104 in compression and a water-resistant constituent 106, is surrounded by a casing 108 helically encircling the compressed longitudinal body of foam 104, typically laterally compressed, and the water-resistant constituent 106. The water-resistant constituent 106 may adhered to the compressed longitudinal body of foam 104 on a first surface or contained within the compressed longitudinal body of foam 104, such as the elastomer coating depicted in U.S. Pat. No. 9,745,738 for Expansion Joint for Longitudinal Load Transfer, issued to Schul International Company, LLC. Because the casing 108 helically encircles the compressed longitudinal body of foam 104 and can accommodate flexing by the overlapping casing 108, the compressed longitudinal body of foam 104 may be cut to length without fear of a shrink-wrap seam failing due to flexion.

The system is particularly beneficial in connection with foam-based expansion joint seal systems, which are often supplied pre-compressed. Pre-compression of such expansion joint seal systems is desirable as installation of the uncompressed expansion joint system can be problematic given the length, often in multiple meters, resulting in long sections above the expansion joint while working in sections on centimeter basis. As the expansion joint seal system may be compressed at installation between one-fifth to one-half the original width to a final density in excess of 300 kg/m³, such installation of uncompressed product can be difficult. It is therefore desirable in the industry to provide the expansion joint seal systems compressed to a size less than the nominal expansion joint size, so the expansion joint seal can be removed from the packaging and rapidly installed before the expansion joint seal system can being to relax and thereby contact the adjacent substrate walls. The present disclosure maintains, and may provides, such precompression with additional benefits.

To facilitate removal of the casing 108, the casing may have a casing internal surface 110 which may have a low friction coefficient. The casing internal surface 110 may be a layer of the casing 108 or may be applied to the casing 108. A casing internal surface 110 having a low coefficient of friction may be particularly beneficial when the associated expansion joint seal system 102 and its compressed longitudinal body of foam 104 includes an adhesive at expansion joint seal system first and second sidewalls 150, 152.

The casing 108 may be overlapped as little as 15% of its width, or as great at 85%, though more or less is possible. As the overlap approaches 15%, the casing 108 provides beneficial tensioning and resilience against external damage.

To maintain the casing 108 in position, the casing may include an external surface with dinginess, such as a polyvinyl chloride or low density polyethylene, or adhesive, preferably an external adhesive surface, such that the successive layering of the casing 108 provides a bond to the prior layer, and, where desired, to the expansion joint seal system 102 or any boards or other materials abutting the expansion joint seal system 102, which may also have adhesive surfaces. Such materials may be applied to only the exterior to-be-overlapped portion, such that the ultimate exposed surface has no such property while bonding to the successive overlap. The casing 108, for example, may overlap 50% of itself with each successive application, where the overlapped exterior surface has an adhesive to bond to the successive application and therefore further retard any propagation of a tear in the resultant packaging 100.

Because the longitudinal body of foam 104 provides elasticity and compressibility in the packaging 100, the casing 108 may be constructed of an inelastic material. Alternatively, the casing 108 may be constructed of a material which is elastic. Regardless of the material from which the casing 108 is constructed, the casing 108 is applied under tension to maintain, and to impart at the level desired, compression to the longitudinal body of foam 104. Moreover, because the casing 108 includes multiple layers of the casing 108 along the expansion joint seal system 102, the failure at any point of the casing 108 does not result in the expansion joint seal system 102 being permitted to expand significantly and reduces the potential for unusable material. This marks a substantial departure from the prior art, wherein the shrink wrap packaging would fail due to impact or flexing, often initially splitting along a seam, and then further failing as the now-permitted expansion of the expansion joint seal system 102 further split the packaging and rendered the product unusable due to the force needed to recompress to the necessary width. The casing 108 may be an inelastic paper of sufficient strength to resist tearing and may be coated externally with a water-resistant layer to ensure maintenance of the packaging 100 in case of precipitation. When desired, conventional bandings can be applied about the packaging 100.

The casing 108 may be formed of a material of sufficient durability to withstand exposure to any additive such as a fire retardant, a hydrophobic additive, or a hydrophilic additive, which may be associated with the expansion joint seal system 102, such as by a coating, infusion or impregnation. Such fire retardants, in amounts sufficient to obtain a desired fire endurance rating under any of the various tests, such as E-119, UL 2079, UL 84, DIN 4102, etc., may otherwise adversely react with the casing 108.

The interior surface of casing 108 may be selected to ensure other materials do not adhere, or may be impermeable to ensure no leakage of additives. Water and airflow resistant constituents 106, may be additives 132 introduced before foaming such as by mixing into the isocyanate or polyol, or after such by infusion and/or impregnation, or may, instead be a layer 134 subsequently applied externally, such as an elastomer or may be internal membranes, force compensating and/or recovery spring members, or other systems known in the art. Notably, such water-resistant constituents 106 may have adhesive surfaces to which the casing 108 may apply pressure but to which the casing 108 should not adhere.

The casing 108 may further include compositions on some or all of its inner and outer surface which react when brought in contact, when the casing 108 is overlapped, and which may therefore provide a more durable chemical bond. The casing 108 may include a first chemically sensitive coating on a first surface and a second chemically sensitive coating on a second surface, where the first chemically sensitive coating is reactive to the second chemically sensitive coating. Likewise, the casing 108 may include heat reactive compositions on one or both surfaces or itself may be heat-reactive, such that the packaging 100 may be subjected to some degree of heating to increase the adhesion between layers of the casing 108, to cause further constriction by shrinking, or to alter other properties, such as permeability or ductility. Similarly, the casing 108 may be an insulating material, precluding substantial heat transfer to the expansion joint system 102. The casing 108 may therefore include cellulose, soy or carob oil derivatives.

Because the compression of the compressed longitudinal body of foam 104 of the expansion joint seal system 102 is maintained by, and may be provided by, the casing 108, the packaging 100 permits the compression ratio of the compressed longitudinal body of foam 104 to be adjusted as needed, such as higher compression or lower compression, even in the same stick or coil. Similarly, because the compression around a transition, a change in direction of the material, varies according to the length of each successive section 114, the tension maintained in the casing 108 during application may be reduced for those sections surrounding a transition. Beneficially, because the casing 108 is continually encapsulating, the expansion joint system 102 may include longitudinal bodies of foam 104 of different seal sizes, i.e, a continuation expansion joint 102 intended for use across a span which includes a section of narrower expansion joint width, avoiding the need for a field splice to accommodate the varying sizes. As a result, the casing 108 may be applied at varying radius, whether as a result of varying compression ratio upon application of the coating or due to the application of a common compression ratio as the expansion joint system 102 varies in dimension.

To ensure sufficient binding of the expansion joint seal system 102, the casing 108 may be overlapped such that a successive section 114 overlaps a prior section 112 by a quarter, 25%, of its width 116. Increased overlaps ensure the casing 108 remains tight against the compressed longitudinal body of foam 104 of the expansion joint seal system 102, but consumes a substantially greater length of casing 108 and results in a thicker casing 108 which must be cut through prior to installation. The interior surface 110 of the casing 108 may include an adhesive edge 111, or may adhere by virtue of an electrostatic charge, or by a high friction surface, preferably on the exterior of the casing 108, or other systems known in the art to maintain the overlap.

The resulting packaging 100 permits dispatch of an expansion joint seal system 102 sized to, or above, the necessary length, avoiding the need for any field splice.

To aid cutting the expansion joint seal system 102 to the desired length, the casing 108 may include a distance indicator 146 at regular intervals, such as feet, yards, or meters. The presence of the distance indicator 146 outside the packaging 100 permits the packaging 100 to be cut to the needed length prior to cutting the casing 108 to open the packaging 100. The use of the casing 108 and, where desired, the distance indicator 146, permits a packaging 100 where the compressed longitudinal body of foam 104 may have a length greater than ten feet.

Figure 2:
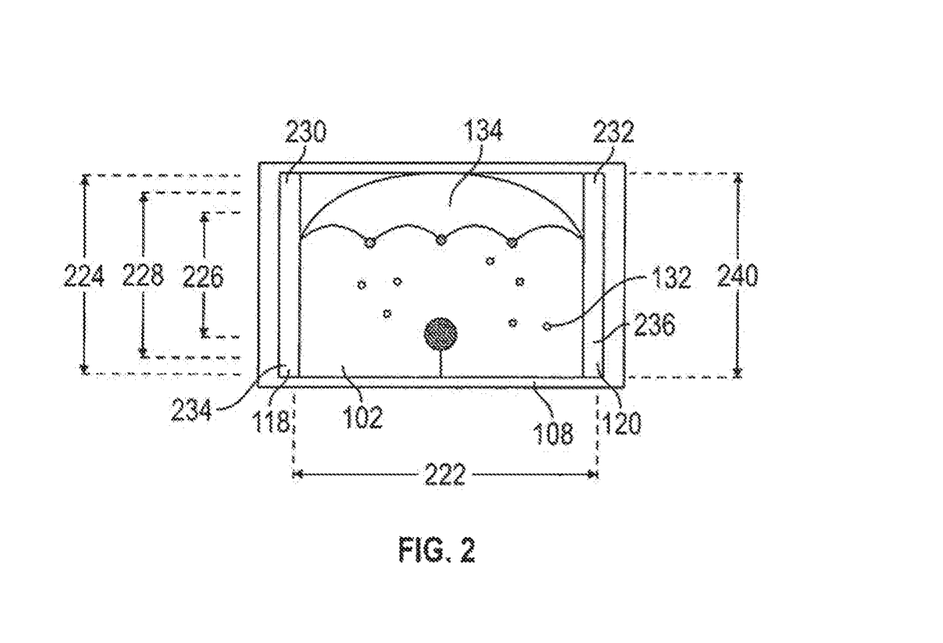
FIG. 2 provides a side view of one embodiment of the present disclosure.

Referring to FIG. 1 and to FIG. 2, an end view of the packaging 100, consistent with pre-compressed foam-based expansion joint seals, the expansion joint seal system 102 may be positioned, while in—or prior to—compression against a board 118 or between a board 118 and a second board 120 prior to be encased within the casing 108. The board 118 is positioned intermediate the compressed longitudinal body of foam 104 and the casing 108 at the interior surface 110 of the casing 108. Preferably the board 118 has a height 224 equivalent to a height 226 of the compressed longitudinal body of foam 104, the foam body height 226. Alternatively, the board height 224 may be equivalent to the height 228 of the expansion joint seal system 102, particularly where an external layer 134 of water-resistant constituent 106 is provided. Thus, the board 118 is positioned intermediate the compressed longitudinal body of foam 104 and the casing 108 in contact with the casing internal surface 110. A second board 120 may be positioned intermediate the compressed longitudinal body of foam 104 and the casing internal surface 110. Preferably the second board 120 also has a second board height 240 equivalent to the height 226 of the compressed longitudinal body of foam 104. Use of one of more boards 118, 120 permits the expansion joint seal system 102 to be laterally compressed so the expansion joint seal system width 222 is maintained in compression at a distance less than the width of the expansion joint into which the expansion joint seal system 102 is be imposed after removal from the casing 108. Beneficially, because the casing 108 is provided as a single, continuous helical wrap around the expansion joint seal system 102, the boards 118 and 120 need to be of great length of even co-terminal. Shorter board 118, 120 might be used and positioned so the ends are not co-terminal, reducing the potential for deflection at any single point. Such boards 118, 120 may even be spliced when appropriate, particularly when the expansion joint seal system 102 includes a transition, such as that the product is in more than one plane. The boards 118, 120 may be of wood, or plastic, or high density paper, any may be constructed from recyclable materials. The boards 118, 120 may be positioned on any surface of the expansion joint system 102, and may be of any size, any may only provide a longitudinal strut to control flexing prior to use.

Figure 3:
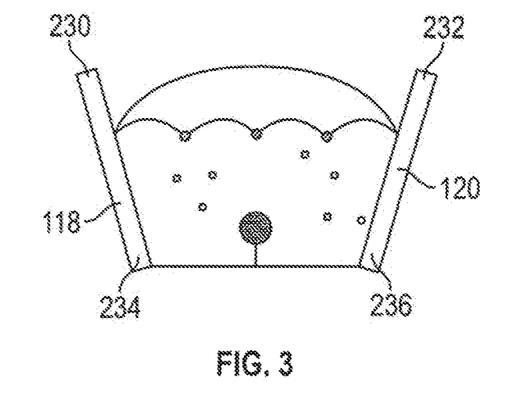
FIG. 3 provides an end view of one embodiment of the present disclosure after imposition between substrates.

Referring to FIGS. 2 and 3, while the first board 118 and the second board 120 are typically aligned in parallel planes, such that the distances between the tops 230, 232 of the first board 118 and the second board 120 and bottoms 234, 236 of each of the first board 118 and the second board 120 are equal, the first board 118 and the second board 120 may be skewed, such that the distance between the first board top 230 and the second board top 232 of the second board is greater than the the distance between the first board bottom 234 and the second board bottom 236, such as illustrated in FIG. 3. Such a skewed construction may be advantageous where the expansion joint seal system 102 incorporates a chambered base. To ensure the compression introduced into the longitudinal body of foam 104 is maintained along the length of a stick of the expansion joint seal system 102, one or both of the board 118 and the second board 120 may have a board first end 142 and a second board first end 144 to which the casing 108 reaches.

Beneficially, because the casing 108 may be applied after the expansion joint seal system 102 is in lateral compression, maintaining compression of the expansion joint system system 102 in other planes is possible. The expansion joint seal system 102 may be subjected to a longitudinal compression in a section immediately subject to the helical encircling by the casing 108, such that the longitudinal compression is retained by the successive layering of the casing 108. Longitudinal compression may be desirable to ensure that, upon release in the expansion joint, the expansion joint seal system 102 is maintained in abutment with the end of the expansion joint and to ensure that any joint is maintained in position. Further, the expansion joint seal system 102 may be subjected to a vertical compression such that the expansion joint seal system height 228 is less than its operational height. Vertical compression may be desirable, particularly in connection with any surface cover over the expansion joint, such as a cover plate, to ensure the expansion joint seal system 102 abuts the cover plate after installation and, when desired, transfers any load from the cover plate to adjacent substrate. Further because the expansion joint seal system 102 is maintained in compression by the packaging 100, the compressed longitudinal body of foam 104 may be provided with different shapes and profiles, such as chamfering at the lower sides, to facilitate compression and installation.

Figure 4:
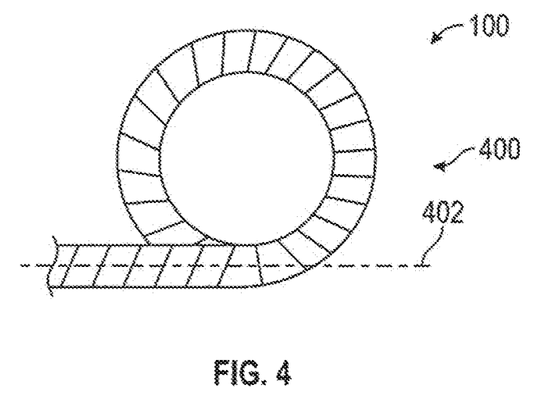
FIG. 4 provides an illustration of a coiled embodiment of the present disclosure.

Unlike any packaging 100 known in the art, use of the casing 108 helically encircling the compressed longitudinal body of foam 104 permits the longitudinal body of foam 104 to itself be helically curved, such that the longitudinal body of foam 104 is bent or curved into a different plane, off a central axis 402, and, while deflected or bent, helically bound with the casing 108, such that each successive section 114 of casing 108 is bound and a constant radius is provided to result in the application of a coiling from a casing 108 provided at the constant radius about that central axis, as illustrated in FIG. 4. The packaging 100 may therefore be directed and coiled in any direction—laterally, vertically or in any combination thereof. Eliminating the conventional stick format permits the storage and shipping of expansion joint seal systems 102 of lengths substantially greater than available in a stick form, potentially eliminates the need for internal field splices, and permits conventional shipping. On the job site, the coil 400 of the packaging 100 can be released by cutting the casing 108, unrolling the coil 400, and opening the packaging 100 and inserting the expansion joint seal system 102 in the expansion joint. Cutting the packaging 100 to the appropriate length using the distance indicators 146 permits the packaging 100 to be maintained as the coil 400 until needed. Alternatively, the coil 400 may be constructed in a vertical plane, inducing the deflection and associated coiling in a plane perpendicular to the longitudinal and lateral axes.

Additional components may be incorporated into the expansion joint seal system 102 and included in the coil 400. One such component may include one or more longitudinal flexible members bonded to the compressed longitudinal body of foam 104 at the longitudinal body of foam top 254 opposite the longitudinal body of foam bottom 256 and capable of transferring a load to the compressed longitudinal body of foam 104, which would have sufficient flexibility in the horizontal plane to permit the coiling if desired. Another component may one or more membranes, which may be permeable or impermeable, which may extend from one side of the compressed longitudinal body of foam 104 to the other, or some portion thereof, which may be in the horizontal plane and which may permit coiling as well. Such membranes may be used to provide an air barrier, vapor permeability, hydrostatic head resistance, electromagnetic frequency/radio frequency interference insulators, or other functions known for association with expansion joint seal systems. Another component may be an elastomeric gland, wherein the compressed longitudinal body of foam 104 may surround the gland, be incorporated in it, or some combination thereof. The packaging 100 provides the potential for lengths far in excess of conventional lengths and, where the gland permits coiling of the expansion joint seal system, the expansion joint seal system 102 may be coiled. Another component may be a combination of one or more flexible members, one or more cover plates, and one or more ribs, where the flexible member is attached to the cover plate and to the rib, such that the ribs extends into the compressed longitudinal body of foam 104. An increased number of cover plates, functional as a series of overlapping shields, may permit the expansion joint seal system 102 to be coiled vertically when packaged and facilitates constant and equal compression throughout the expansion joint seal system 102. Beneficially, the compressed longitudinal body of foam 104 may be offset with respect to these additional components, or extend past the end of the compressed longitudinal body of foam 104, such that the additional component provides a mating surface for another expansion joint seal system 100, to serve as a splice when desired. While a splice is ideally avoided in a run of the expansion joint seal system 102 by the present invention, should a second expansion joint seal system intersect the first, such as in a T or angled joint, such additional components may provide the splice.

Figure 5:
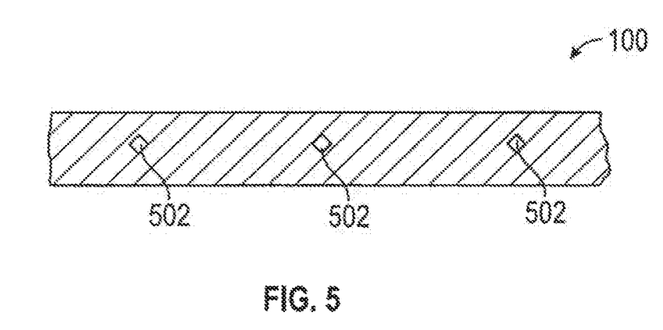
FIG. 5 provides an illustration of one embodiment with internal tear strips.

Referring to FIG. 5, to further aid in installation, internal tear strips 502 may be affixed to the casing 108 at regular intervals associated with the circumference of the expansion joint seal system 102 and any boards 118, 120, such that the tear strips are commonly positioned along the length of the packaging 100 and may tear the casing 108 for a desired distance, such as in two-foot sections. Other tools may be used to separate the casing, such as box knives, particularly those with depth control and automatic retracing systems.

Figure 6:
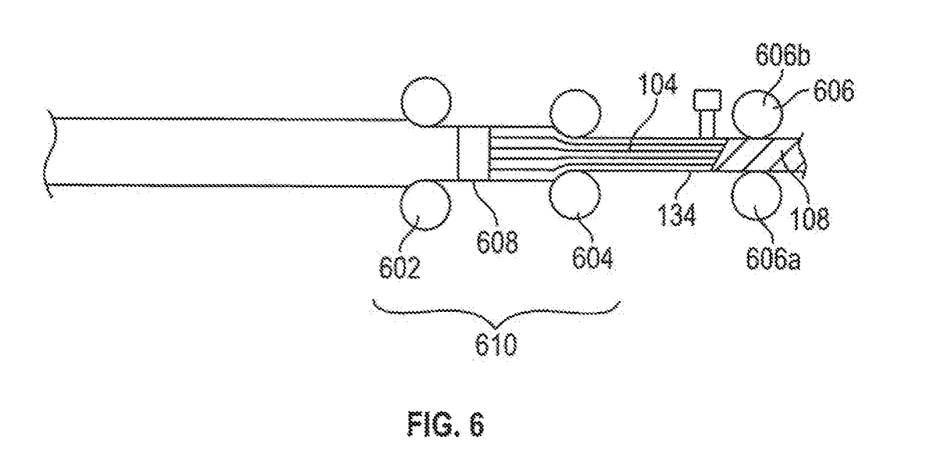
FIG. 6 provides an illustration of a structure for processing one embodiment of the present disclosure.

The expansion joint seal system 102 may be compressed prior to or during the application of the casing 108. For example, the expansion joint system 102 may be processed through one or more sets of rollers, such as depicted in FIG. 6, wherein each roller set 602, 604 provides an increased compression during which any external layer 134 of water-resistant constituent 106 is applied by an applicator 608, and after which the compressed longitudinal body of foam 104 is subsequently maintained by a final roller set 606 until the application of the casing 108, which may be after the imposition of the board 118, 120 about the expansion joint seal system 102.

Figure 7:
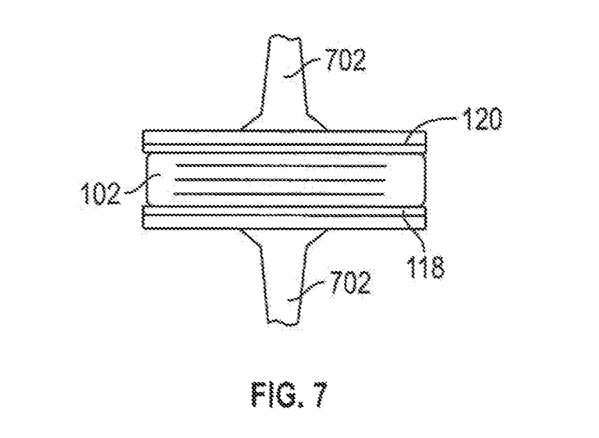
FIG. 7 providers an illustration of an alternative structure for processing one embodiment of the present disclosure.

Alternatively, the boards 118, 120 may be applied to the sides of the expansion joint seal system 102 prior to the imposition of compression, such as by the rollers 602, 604 as previously described, or by a lateral press 702 as illustrated in FIG. 7. The boards 118, 120 may facilitate the compression in both systems by resisting any problematic necking of the expansion joint seal system 102 when passing between rollers 620, 604 or by providing a working surface for the application of force by a lateral press 702. The roller system 610 depicted in FIG. 6 permits a longer run of the expansion joint seal system 102 as the board 118, 120 limit the length which can be readily transported in packaging. The roller system 610 depicted in FIG. 6 facilitates the forming of the coil 400 at the final set of rollers 606, such as by a guide offsetting the expansion joint seal system 102 after exit from the final set of rollers 606, or by one roller 606a, 606b of the final set of rollers 606b introducing a greater amount of compression on one side than the other.

Alternatively, the casing 108 may itself be applied to introduce the compression of the longitudinal body of foam 104 in the expansion joint seal system 102 during encirclement. The casing 108 therefore provides a packaging 100 which may be provided without the structural support of boards 118, 120, which must be disposed after unpackaging. The casing 108 may be tensioned, such that once a first end of the casing 108 is affixed or bound to the expansion joint seal system 102, the casing 108 under tension may be wrapped about the expansion joint seal system 102, while the expansion joint seal system 102 is maintained in position, permitting the necessary amount of casing 108 to be released while the supply of the casing 108 revolves about the expansion joint seal system 102 or while the expansion joint seal system 102 is rotated about a central axis. Where the first board 118 and the second board 120 are used, the resultant compression would be limited to lateral compression. Where the expansion joint seal system 102 is directly encircled by the casing 108 with any board, the expansion joint seal system 102 may be compressed laterally and vertically (under compression between a longitudinal body of foam top and a longitudinal body of foam bottom). Where the rate of advance of the expansion joint seal system 102 is decreased immediately prior to the encirclement by the casing 108, the expansion joint seal system 102 may also be compressed longitudinally. Alternatively, where the rate of advance of the expansion joint seal system 102 is increased Beneficially, the casing 108 may be used in connection with expansion joint seal systems 102 which incorporate other components beyond a longitudinal body of foam 104, such as one or more membranes, such as disclosed in U.S. Pat. No. 9,803,357 and by U.S. Patent Application Publication 2017-0159817, both by Schul International Company, LLC, each of which teach a membrane extending to or beyond the sides of the foam, which may therefore be positioned against one or more of the external surfaces for packaging. The casing 108 may thus contact the winged membranes or extensions, which may serve as the bond breaker or support for the now-compressed expansion joint seal systems 102, such that only the wrapping material is required reducing weight and waste.

A second layer of casing 108 may be applied about some or all of the expansion joint seal system 102 when encircled in the casing 108 to provide a second compression ratio in the applied area. When a second layer of casing 108 is used, the overlap may be reduced to less than 15% and may be be entirely eliminated.

The foregoing disclosure and description is illustrative and explanatory thereof. Various changes in the details of the illustrated construction may be made within the scope of the appended claims departing from the spirit of the invention. The present invention should only be limited by the following claims and their legal equivalents.

I claim:

1. An expansion joint seal system, comprising:
 a longitudinal body of foam in compression;
 the longitudinal body of foam in compression impregnated with a fire retardant additive; and
 a casing in tension helically compressively encircling the longitudinal body of foam in compression and a water-resistant constituent.

2. The expansion joint seal system of claim 1, further comprising:
 the casing having an internal surface, the internal surface contacting the longitudinal body of foam, the internal surface having a low friction coefficient.

3. The expansion joint seal system of claim 1, wherein a successive section of the casing overlaps a prior section of the casing by 15%.

4. The expansion joint seal system of claim 1, further comprising:
 a board intermediate the longitudinal body of foam in compression and the casing at a first side of the casing, the board having a board height, the longitudinal body of foam in compression having a foam body height, the board height being greater than or equal to the foam body height.

5. The expansion joint seal system of claim 4, further comprising:
 a second board intermediate the longitudinal body of foam in compression and the casing at a second side of the casing, the second board having a second board height, the second board height being greater than or equal to the foam body height.

6. The expansion joint seal system of claim 5, wherein the board and the second board are in parallel planes.

7. The expansion joint seal system of claim 5, wherein the board and the second board are askew, and wherein the board has a first end adjacent a first end of the longitudinal body of foam in compression, and the second board has a first end adjacent the first end of the longitudinal body of foam in compression.

8. The expansion joint seal system of claim 1, wherein the casing is paper.

9. The expansion joint seal system of claim 1, wherein the casing is inelastic.

10. The expansion joint seal system of claim 1, wherein the longitudinal body of foam in compression has a length greater than ten feet.

11. The expansion joint seal of claim 1, wherein the casing bears a distance indicator at regular intervals.

12. The expansion joint seal of claim 1, wherein the longitudinal body of foam in compression is under compression laterally between a first sidewall and a second sidewall.

13. The expansion joint seal of claim 1 wherein the longitudinal body of foam in compression is under compression laterally between a first sidewall and a second sidewall and is under compression longitudinally.

14. The expansion joint seal of claim 1 wherein the longitudinal body of foam in compression is under compression laterally between a first sidewall and a second sidewall and the longitudinal body of foam in compression is under compression between a longitudinal body of foam top and a longitudinal body of foam bottom.

15. The expansion joint seal of claim 1 wherein the longitudinal body of foam in compression is under compression laterally between a first sidewall and a second sidewall, the longitudinal body of foam in compression is under compression longitudinally and the longitudinal body of foam in compression is under compression between a longitudinal body of foam top and a longitudinal body of foam bottom.

16. The expansion joint seal system of claim 1, wherein the casing includes an external adhesive surface.

17. The expansion joint seal system of claim 1, wherein the casing includes a heat sensitive coating.

18. The expansion joint seal system of claim 1, wherein the casing includes a first chemically sensitive coating on a first surface and a second chemically sensitive coating on a second surface, the first chemically sensitive coating reactive to the second chemically sensitive coating bonding the first surface to the second surface.

\* \* \* \* \*